Patented Feb. 9, 1943

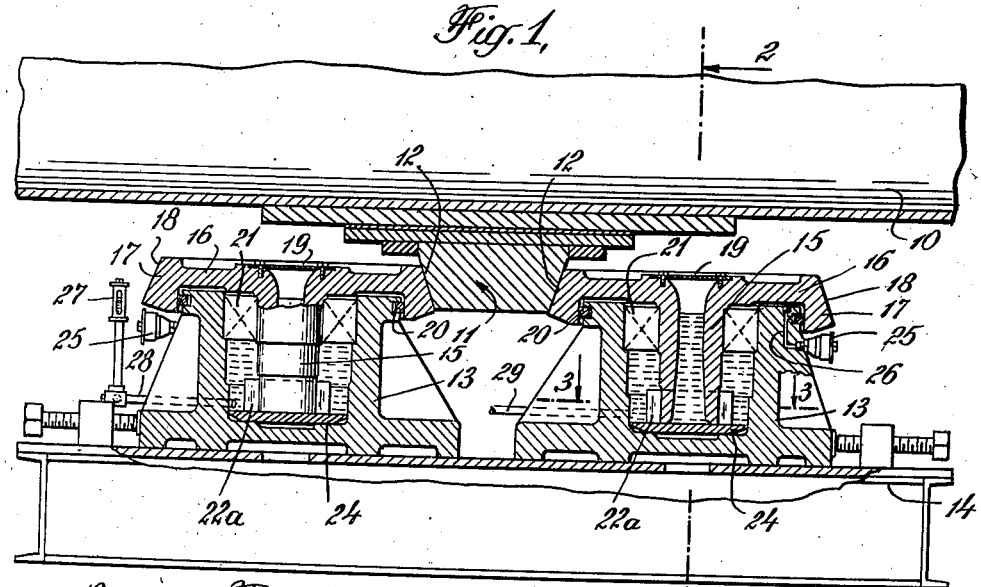
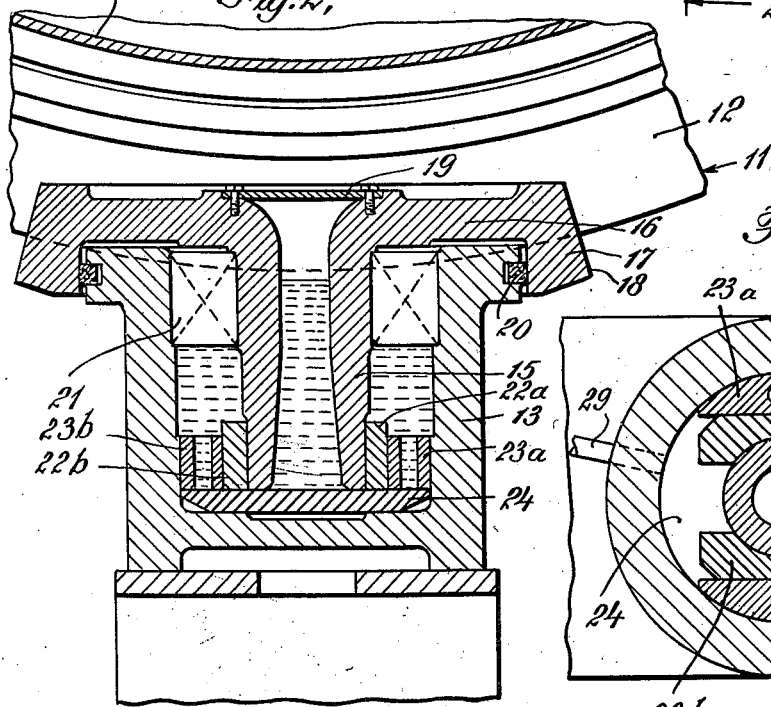
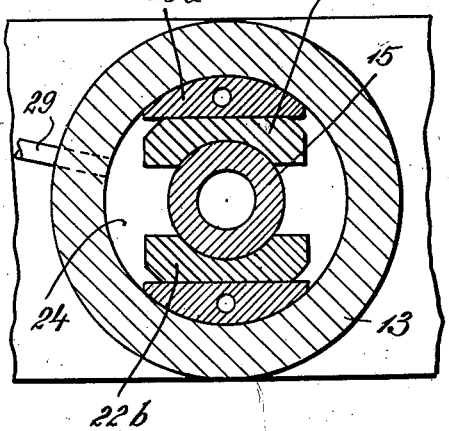

2,310,473

UNITED STATES PATENT OFFICE 2,310,473

THRUST MECHANISM

Ejnar Svendsen, Cranford, N. J., assignor to F. L. Smidth & Co., New York, N. Y., a corporation of New Jersey Application April 24, 1942, Serial No. 440,387

4 Claims. (Cl. 308—203)

This invention relates to bearing devices for receiving the end thrust of a rotary shell, such as a rotary cylindrical kiln, etc., and is concerned more particularly with a novel bearing device which includes a roller contacting with a tire on the shell and a mounting for the roller which permits the roller to align itself, so that proper contact between the tire and roller is always maintained and difficulties which might otherwise arise from misalignment of the contacting parts or improper machining thereof are avoided.

The bearing devices heretofore employed for taking the end thrust of a rotary shell have commonly included a roller having a surface engaging the surface of a tire on the shell and a shank extending into a bearing box and mounted for rotation in upper and lower bearings in the box. In some constructions, the line of thrust through the contacting surfaces on the tire and the roller lies in a plane above the upper bearing, so that both bearings take the load. In another construction, the head of the roller is provided with an overhang and the line of thrust through the contacting surfaces on the tire and the roller lies in a plane passing through the upper bearing, so that the greater part of the thrust is taken by that bearing, although the lower bearing also shares the load. In both constructions described, the roller is mounted for rotation on a fixed axis, and, consequently, if the bearing surfaces on the roller and tire are not perfectly machined or if there is misalignment of the parts, there is not a perfect line of contact between the roller and tire surfaces and rapid wear ensues.

The present invention is directed to the provision of a thrust mechanism which overcomes the disadvantage inherent in the devices heretofore employed and is so constructed that a proper line contact between the contacting surfaces of the mechanism and the tire on the shell is maintained at all times. The desired purpose is accomplished in the new mechanism by the use of a roller having a surface engaging a similar surface on the tire of the shell and having a shank which is supported for rotation in a self-aligning bearing which lies in a line with the line of thrust through the contacting surfaces. The bearing takes substantially all of the load and, because of the self-aligning characteristic of the bearing, the roller is free to adjust itself so that the desired contact between the roller and tire surfaces is insured.

For a better understanding of the invention, reference may be had to the accompanying drawing in which Fig. 1 is a longitudinal section through a portion of a rotary kiln and through two of the new devices used in connection with the kiln; and Figs. 2 and 3 are sectional views on the lines 2—2 and 3—3, respectively, of Fig. 1.

In the installation illustrated in the drawing, the rotary kiln 10 is provided with a tire 11 mounted thereon in the usual manner. This tire has lateral surfaces 12 which preferably converge toward the outer face of the tire and these surfaces are those through which the thrust is applied to the bearing devices of the invention.

In the constructions shown, there are two such devices and, as they are of similar construction, only one need be described. The device includes a bearing box 13 bolted to a base 14 and the box has an open upper end and a closed lower end, so that it may hold a quantity of lubricant. Extending into the open top of the box is the shank 15 of a roller having a head 16 overlying the upper end of the box. The head of the roller has a circumferential flange 17 formed with a conical surface 18 which runs in contact with a surface 12 on the tire 11, the flange extending downwardly below the upper end of the box. The shank is hollow with its upper end closed by a plate 19 and a packing ring 20 entering a circumferential slot in the outer wall of the upper end of the box bears against the inner surface of the flange. The plate and the ring prevent the escape of lubricant from and the admission of dust into the interior of the box.

Mounted within the box near the upper end thereof is a bearing 21 of the self-aligning type, the outer race of the bearing engaging the inner wall of the box and being seated on a suitable shoulder therein and the inner race engaging the outer surface of shank 15. Any of the well-known commercial types of self-aligning bearing of suitable capacity may be employed for the purpose. The construction of the roller and the location of the bearing are such that the line of thrust through the tire surface 12 and the flange surface 18 passes through the bearing.

The lower end of the shank enters a bushing which, in the construction shown, is formed of two parts 22a, 22b. These bushing members have curved seats in their opposed faces in which the lower end of the shank is received and their outer faces are flat. The bushing members lie between a pair of parallel guides 23a, 23b secured to a plate 24 seated in the bottom of the box. The guide members are so disposed as to permit movement of the bushing and the lower end of the shank in a direction lengthwise of the longitudinal axis of the shell but to prevent movement of those parts in a direction transverse to that axis.

Any suitable means may be provided for maintaining the supply of lubricant in the interior of the box and in the construction shown, the box is provided with a lubricant supply fitting 25 through which lubricant may be introduced through a passage 26 discharging lubricant in the space between the upper end of the box and the lower surface of the roller head, the lubricant then flowing into the interior of the box. In order that the level of the lubricant may be known at all times, the box may be provided with a gauge of any suitable construction. In the installation illustrated, the box at the left has such a gauge designated 27, which is connected to the interior of the box by a tube 28. The box at the right is provided with a similar tube 29 leading to a gauge not shown.

With the construction described, the line of thrust passes through the contacting surfaces 12 and 18 on the tire and roller, respectively, and through the bearing 21, so that if the parts are not properly machined or there is misalignment for any reason, the bearing permits the roller to adjust itself to insure the desired contact. This movement involves tilting of the shank of the roller in a plane parallel to the longitudinal axis of the shell and such tilting movement is permitted by the bushing which can slide between the guides parallel to that axis. Because of the frictional drag in the bearing, the roller has a slight tendency to swing with its shank tilting in a plane transverse to the longitudinal axis of the shell and this tendency is overcome by engagement of the bushing with the guide members. It is to be understood that the bushing takes no thrust but only resists the drag mentioned. The bushing is, therefore, not to be confused with the lower bearing previously employed in devices in which the roller is mounted for rotation on a fixed axis in upper and lower bearings.

I claim:

1. A thrust mechanism for receiving the end thrust of a rotary shell, such as a rotary kiln, which comprises a bearing box having an open top, a roller having a shank entering the top of the box and a head extending outwardly over the top of the box and provided with a thrust receiving surface adapted to roll on a similar surface on a tire on the shell and to take the thrust of the shell, a self-aligning bearing interposed between the shank and the inner wall of the box and lying in alignment with the line of thrust through the contacting surfaces on the head and tire, and means within the box engaging the lower end of the shank and preventing movement thereof in a direction transverse to the longitudinal axis of the shell, the shank being permitted to move lengthwise of said axis by said means as the bearing aligns itself.

2. A thrust mechanism for receiving the end thrust of a rotary shell, such as a rotary kiln, which comprises a bearing box having an open top, a roller having a shank entering the top of the box and a head extending outwardly over the top of the box and provided with a thrust receiving surface adapted to roll in a similar surface on a tire on the shell and to take the thrust of the shell, a self-aligning bearing interposed between the shank and the inner wall of the box and lying in alignment with the line of thrust through the contacting surfaces on the head and tire, a bushing within the box engaging the lower end of the shank, and guideways for the bushing within the box permitting movement of the bushing and the lower end of the shank in a direction parallel to the axis of the shell only.

3. A thrust mechanism for receiving the end thrust of a rotary shell, such as a rotary cylindrical kiln, which comprises a bearing box having an open top, a roller having a shank entering the top of the box and a head closing the upper end of the box and provided with a flange overhanging the upper end of the box and formed with a conical thrust receiving surface adapted to roll on a similar surface on a tire on the shell and to take the thrust of the shell, a self-aligning bearing interposed between the shank and the inner wall of the box and lying in alignment with the line of thrust through the contacting surfaces on the flange and tire, means within the box engaging the lower end of the shank and preventing movement thereof in a direction transverse to the longitudinal axis of the shell, the shank being permitted to move lengthwise of said axis by said means as the bearing aligns itself, the box being adapted to contain a lubricant, and a packing between the upper end of the box and the overhanging portion of the head to seal the upper end of the box.

4. A thrust mechanism for receiving the end thrust of a rotary shell, such as a rotary kiln, which comprises a bearing box having an open top, a roller having a shank entering the top of the box and a head extending outwardly over the top of the box and provided with a conical thrust receiving surface adapted to roll on a similar surface on a tire on the shell and to take the thrust of the shell, a self-aligning bearing interposed between the shank and the inner wall of the box and lying in alignment with the line of thrust through the contacting surfaces on the head and tire, a pair of guides within the box near its lower end having guiding surfaces extending parallel to the longitudinal axis of the shell, and a pair of bushing members having portions engaging the shank of the roller and movable along said guiding surfaces.

EJNAR SVENDSEN.